United States Patent [19]

Goldenberg

[11] Patent Number: 4,922,804

[45] Date of Patent: May 8, 1990

[54] VARIABLE SPEED HYDRAULIC UNIT

[75] Inventor: Nahum Goldenberg, Kiriat Ono, Israel

[73] Assignee: Renato Brevini, Emilia, Italy

[21] Appl. No.: 217,364

[22] Filed: Jul. 11, 1988

[30] Foreign Application Priority Data

Jul. 23, 1987 [IT] Italy .................. 21415 A/87

[51] Int. Cl.⁵ ............................... F15B 11/00
[52] U.S. Cl. ........................... 91/532; 91/533; 74/720; 475/73
[58] Field of Search ............. 74/687, 720, 718, 730, 74/793; 60/483, 484; 91/532, 533, 534

[56] References Cited

U.S. PATENT DOCUMENTS

| | | |
|---|---|---|
| 1,229,076 | 6/1917 | Hayes . |
| 2,415,603 | 2/1947 | Muller et al. . |
| 2,568,528 | 9/1951 | Welte . |
| 2,748,621 | 6/1956 | Sinclair . |
| 2,839,011 | 6/1958 | Kugel . |
| 2,970,641 | 2/1961 | Rosen et al. . |
| 3,215,042 | 11/1965 | Holley . |
| 3,421,389 | 1/1989 | Fauchere . |
| 3,579,988 | 5/1971 | Hancock et al. . |
| 3,757,524 | 9/1973 | Poyner et al. .......... 60/483 |
| 3,788,075 | 1/1974 | Holdeman . |
| 3,864,910 | 2/1975 | Mechin . |
| 3,898,916 | 8/1975 | Renner et al. . |
| 3,948,049 | 4/1976 | Ohms et al. . |
| 3,958,419 | 5/1976 | Laing ................ 60/483 X |
| 4,098,083 | 7/1978 | Carman . |
| 4,154,425 | 5/1979 | Smith . |
| 4,341,132 | 7/1982 | Burdick ................ 74/687 |
| 4,373,332 | 2/1983 | Holmen . |
| 4,377,222 | 3/1983 | Sommer . |
| 4,392,393 | 7/1983 | Montgomery . |

FOREIGN PATENT DOCUMENTS

| | | |
|---|---|---|
| 0051795 | 5/1982 | European Pat. Off. . |
| 1949973 | 4/1971 | Fed. Rep. of Germany . |
| 2556027 | 6/1977 | Fed. Rep. of Germany . |
| 3112931 | 10/1982 | Fed. Rep. of Germany . |

Primary Examiner—Edward K. Look
Attorney, Agent, or Firm—Jacobson and Johnson

[57] ABSTRACT

The variable speed hydraulic unit has the peculiarity of comprising a fixed body and a rotatable body with hydraulic actuation and fixed displacement, which are operatively interconnected. The output shaft of the fixed body is rigidly associated with the input of the rotatable body in turn operatively associated with a terminal output shaft. A flow divider is furthermore provided for dividing the flow of working fluid fed at a constant flow-rate, having its deliveries connected respectively to the fixed body and to the rotatable body, the percentual distribution between the deliveries determining the direction and speed of rotation of the terminal output shaft.

11 Claims, 4 Drawing Sheets

VARIABLE SPEED HYDRAULIC UNIT

BACKGROUND OF THE INVENTION

The present invention relates to a variable speed hydraulic unit.

As known, one of the problems currently strongly felt in the production of hydraulic motors is inherent to the adjustment of the operating speed.

In currently known apparatus this speed regulation is substantially obtainable by varying the flow-rate of the working fluid, with considerable problems regarding the possibility of realizing this flow-rate variation, together with the fact that the flow-rate variation unavoidably causes power and performance variations.

Thus, at present, regulation of the speed of a hydraulic motor is actually obtainable either, with extremely limited possibilities regarding the achievable degree of speed variation, or with a compulsory significant increase in the constructive complexity of the equipment employed.

SUMMARY OF THE INVENTION

The aim of the present invention is indeed to solve the above described problem by providing a hydraulic unit which allows continuous and precise variation of the speed of the output shaft, without varying the total input flow-rate, with the possibility of obtaining a vast and continuous range of speeds in both directions of rotation.

Within the above described aim, a particular object of the invention is to provide a hydraulic unit which, by virtue of the possibility of a continuous speed adjustment, can be applied in various fields, always complying with optimum operating criteria.

Another object of the present invention is to provide a hydraulic unit with continuously variable speed which, by virtue of its peculiar constructive characteristics, is capable of giving the greatest assurances of reliability and safety in use.

Not least object of the present invention is to provide a variable speed hydraulic unit which can be manufactured with elements and commonly commercially available materials and which is furthermore advantageous from a merely economical point of view.

The above cited aim and objects and others which will become apparent hereinafter, are achieved by a variable speed hydraulic unit, characterized in that it comprises a fixed body and a rotatable body actuated hydraulically with fixed displacement and operatively interconnected to each other, the output shaft of said fixed body being rigidly associated with the input of said rotatable body, in turn operatively associated with a terminal output shaft, a flow divider being furthermore provided for working fluid fed at constant flow-rate and having deliveries connected respectively to said fixed body and to said rotatable body, the percentual distribution between said deliveries determining the direction and the speed of rotation of said terminal output shaft.

BRIEF DESCRIPTION OF THE DRAWINGS

Further characteristics and advantages of the invention will become apparent from the description of a preferred but not exclusive embodiment of a variable speed hydraulic unit, illustrated only by way of non-limitative example in the accompanying drawings, wherein:

FIG. 5 is a diagram of a closed-loop hydrostatic drive unit;

DESCRIPTION OF THE PREFERRED EMBODIMENTS

With reference to the above-cited drawing figures, the variable speed hydraulic unit according to the invention substantially comprises a fixed body 1 and a rotatable body 2, which are preferably constituted by fixed displacement hydraulic motors.

Figure 1:
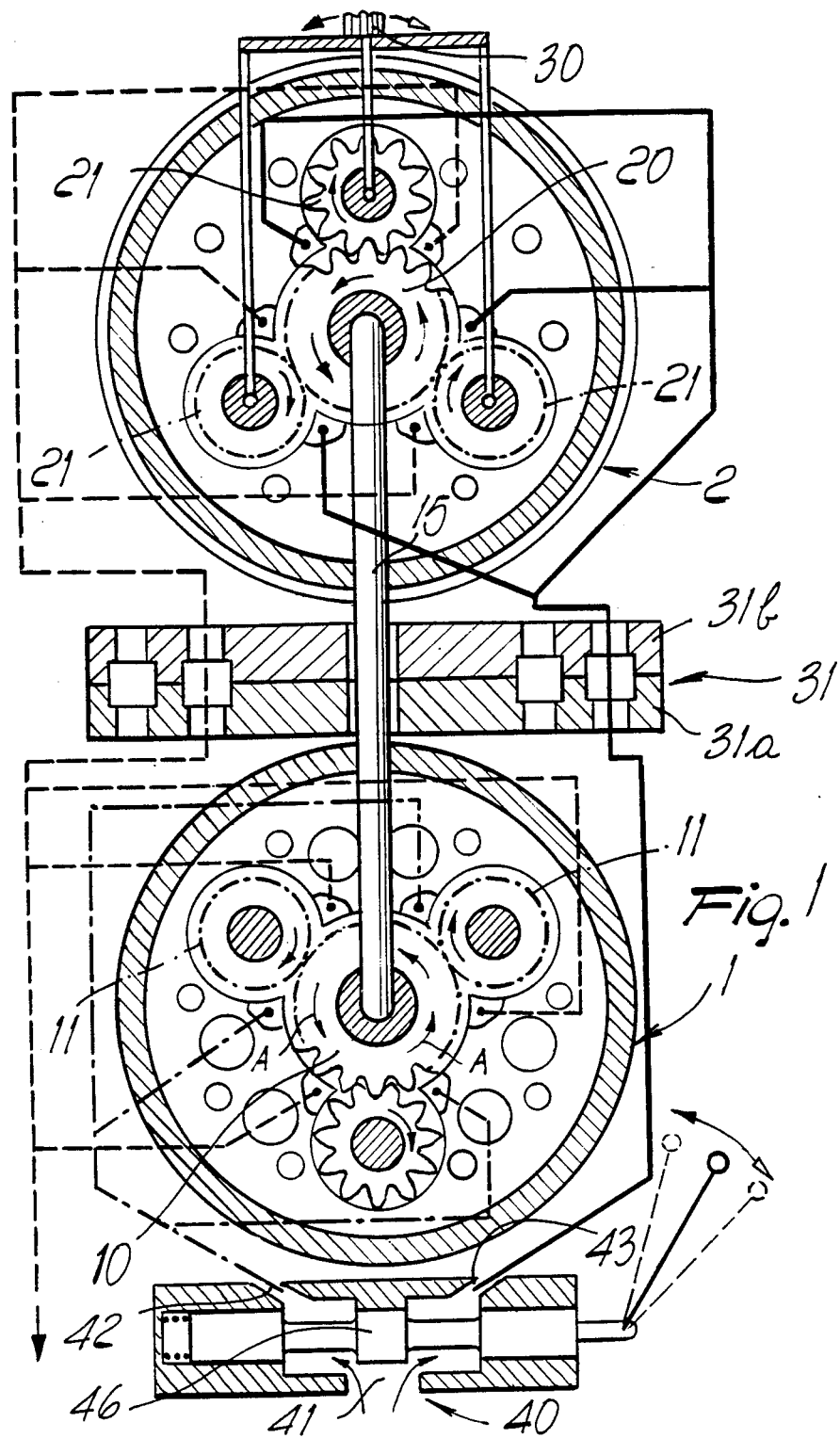
FIG. 1 is a schematic cross-section view of the hydraulic unit taken on a horizontal plane and illustrated so as to highlight its logical operation.
Figure 2:
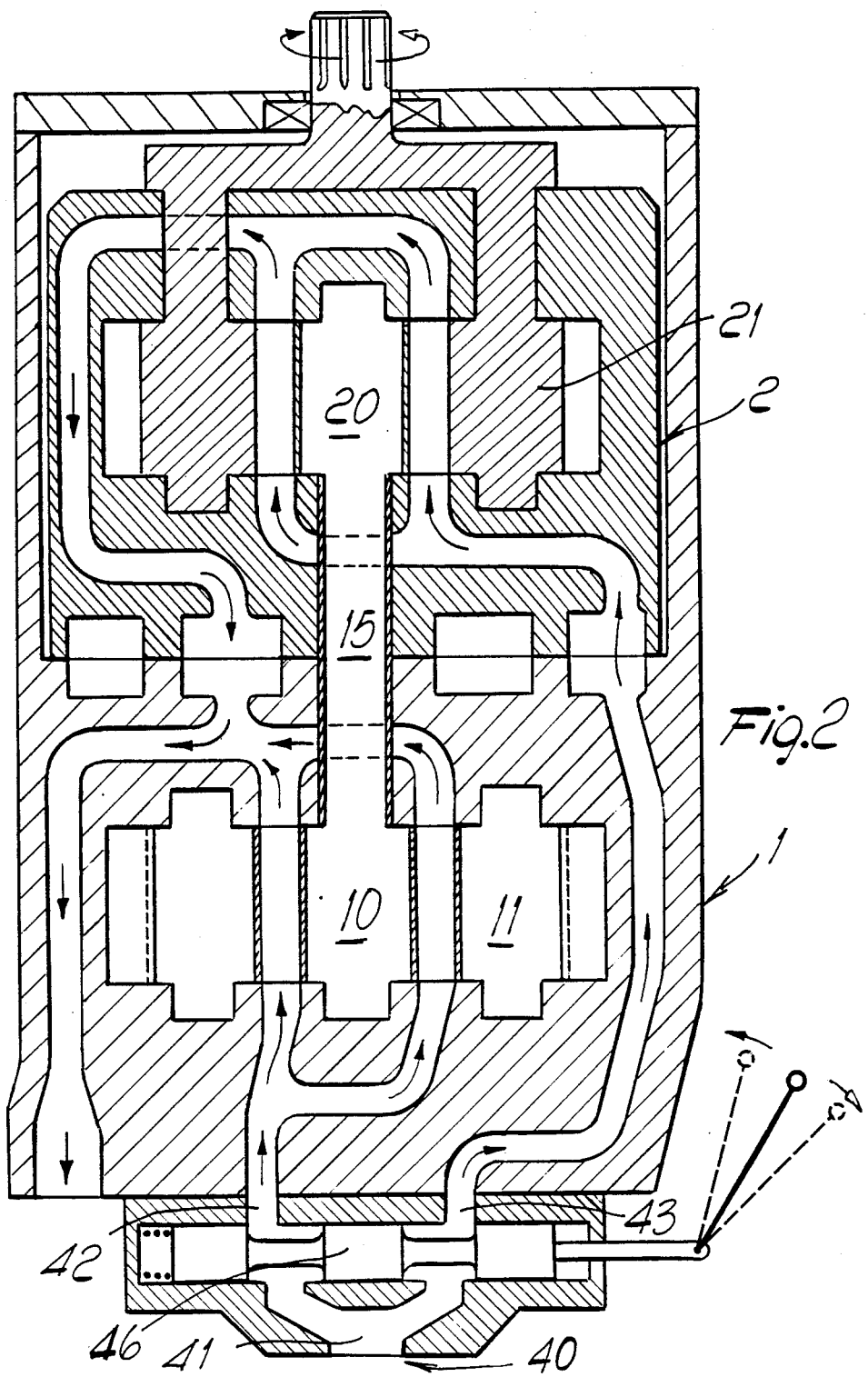
FIG. 2 is a schematic cross-section view of the hydraulic unit according to an embodiment thereof, taken on a theoretical vertical plane.

FIG. 1 is a schematic representation wherein the dotted-and-broken line indicates the delivery to the fixed body 1 and the solid line indicates the delivery to the rotatable body 2, while the discharge of the hydraulic working fluid is indicated in broken lines.

The illustration of FIG. 1 is not a structural representation but merely a conceptual representation which highlights the functional interconnections between its constituent parts.

The fixed body 1 is preferably but not necessarily constituted by a gear motor having a sun gear 10 engaged by one or more planetary gears 11. In the specific example three planetary gears are illustrated, but, obviously, the number of planetary gears may be different.

In a per se known manner the delivery of the working fluid is fed to the gears 10 and 11 so that the sun gear is caused to rotate according to the direction indicated by the arrows A in FIG. 1.

A shaft or other connection means 15 is rigidly rotatively associated with said sun gear 10 and is connected to the input of the rotatable body 2, which is also preferably constituted by a gear motor having a structure which is conceptually similar to that of the fixed body.

The peculiarity of the invention, according to one aspect thereof, resides in the fact that it comprises a toothed sun wheel 20 which is rigidly rotatively associated with the sun gear 10 and engages planetary toothed wheels 21, which are mounted for rotation about the toothed sun wheel and kinematically interconnected so as to transmit motion to a terminal output shaft indicated by the reference numeral 30.

Obviously, in order to allow the coupling between the fixed body 1 and the rotatable body 2, a joint 31 is interposed which has a fixed part 31a connected to the fixed body and a rotating part 31b connected to the rotatable body.

The feeding of the working fluid occurs through a flow divider, generally indicated by the reference numeral 40, which has an input 41 connected e.g. to a pump feeding fluid at a constant flow-rate; the deliveries 42 or outlets 43 of the divider 40 are respectively connected to the fixed body 1 and to the rotatable body 2, with the possibility of effecting a proportional variation between the flow which is fed to the fixed body and the flow which is fed to the rotatable body.

In practical operation, the coupling which joins the sun gear and the toothed sun wheel causes them to rotate at the same rate; consequently, by acting on the slider 46 of the flow divider and increasing the flow-rate towards the fixed body 1, the toothed sun wheel 20 is also caused to rotate at the same rate as the sun gear 10, which rate depends on the flow-rate fed to the fixed body; consequently the rotatable body is affected by a smaller flow-rate, since the total flow-rate is constant, and thus the casing which couples the three planetary toothed wheels is forced to rotate in the same direction as the toothed sun wheel and at a rate which is determined by the difference between the two flow-rates.

If the flow-rate entering the rotatable body 2 is increased by means of the slider of the flow divider, the direction of rotation is inverted, since the casing which joins the planetary toothed wheels 21 has to compensate for the relatively low speed of the toothed sun wheel and can consequently impart a rotation in the opposite direction to the output shaft.

If the flow-rates entering the fixed body and the rotatable body are substantially equal, the motion at the terminal output shaft is substantially null.

By means of the described arrangement, therefore, with an equal input-flow rate, which always remains constant, it is possible to obtain a complete variation of speed from one direction of rotation to the opposite direction of rotation, simply by varying the proportions between the flow of fluid entering the fixed body and the flow of fluid entering the rotatable body, the two extremes corresponding to the maximum speed in the opposite direction, if the complete flow of fluid enters the fixed body or the rotatable body, with the intermediate phase wherein the shaft is motionless in the event that flow of fluid is equally distributed between the fixed body and the rotatable body.

Figure 3:
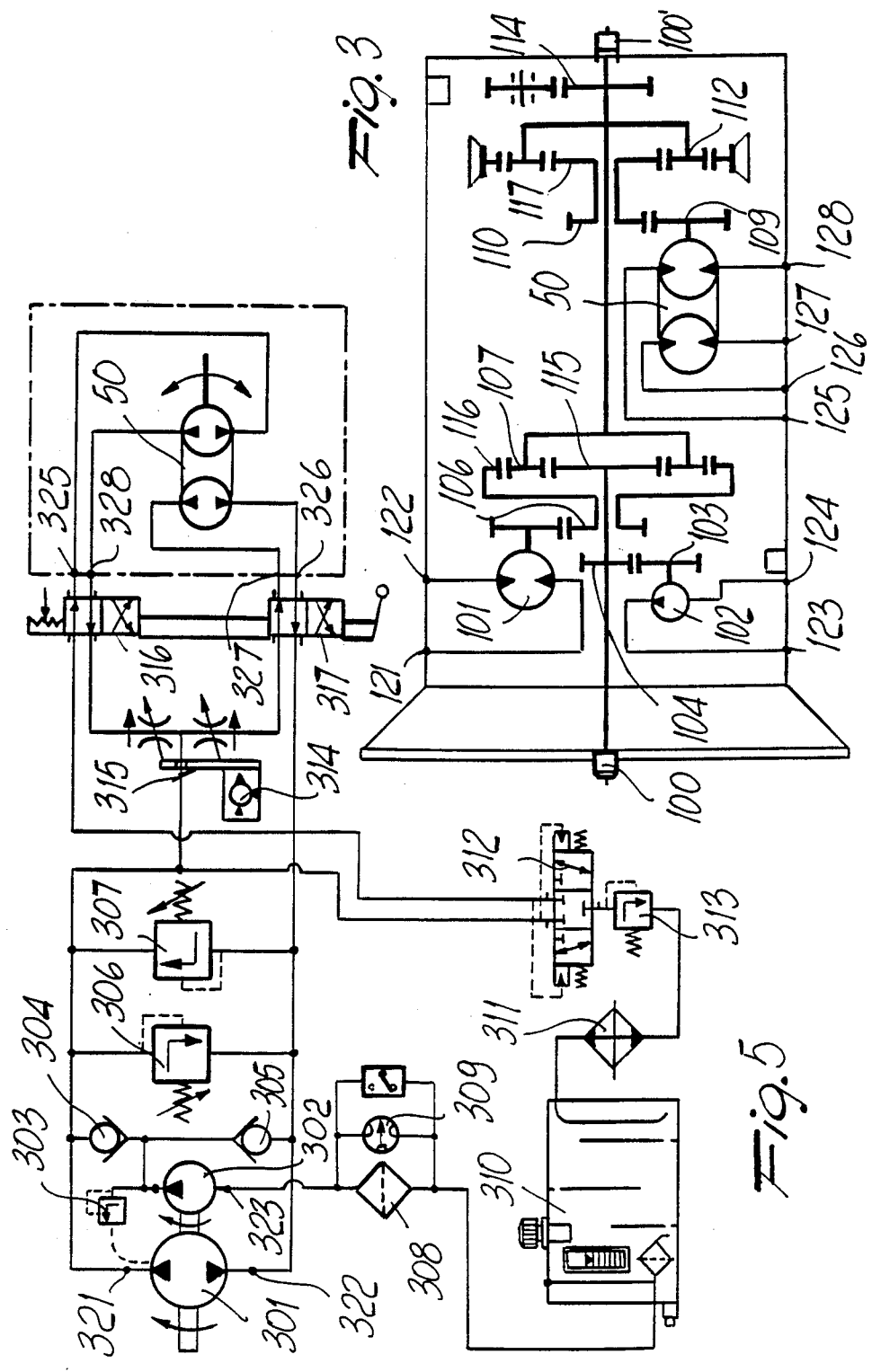
FIG. 3 is a schematic view of the hydraulic unit according to the invention applied to a hydraulic differential.

With reference to FIG. 3, a particular application of the hydraulic unit according to the invention is illustrated, which unit can be used as a differential hydraulic drive for a motor vehicle, employing in practice the hydraulic unit according to the invention as a hydrostatic motor.

In the specific example the input shaft 100 is actuated by a power source which may be constituted by a diesel engine or by another type of engine; the shaft 100, by means of the gear wheel 104, drives the pump 102 through the gear 103. The gear wheel 104 is also connected to the pinion 115 which drives the planetary gears 107 which are thus stationary when the output shaft 100' is stationary. Due to this fact the sun gear 116 and the gear 106 which is connected thereto are caused to rotate according to a certain ratio, so that the gear 105 drives the pump 101; the output flow of the pump 101 is directed by means of the ports 121 and 122 to the hydraulic unit according to the invention, indicated by the reference numeral 50, through the ports 125, 126, 127 and 128. The hydraulic unit 50 starts to rotate and increases the output speed of the gear 109 at the pinions 110 and 117, driving the planetary gears 112 according to the output speed of the toothed wheel 114 which is directly connected to the output shaft, so that the output speed increases and the output shaft, which is also connected to the first support 107 of the planetary gears, increases its speed; when the output speed increases, the speed of the sun gear 116 and its gear 106 decreases proportionally, and as a result the gear 105 drives the pump 101 so that it rotates at a lower speed, while the output shaft increases its speed. This situation continues until the output shaft reaches the maximum speed and the pump 101 is stationary, thus allowing a purely mechanical drive.

Said ports 121, 122, 123, 124, 125, 126, 127 and 128 are hydraulically connected by means of elements capable of allowing the hydraulic unit to be driven and to rotate adequately.

Figures 4, 6:
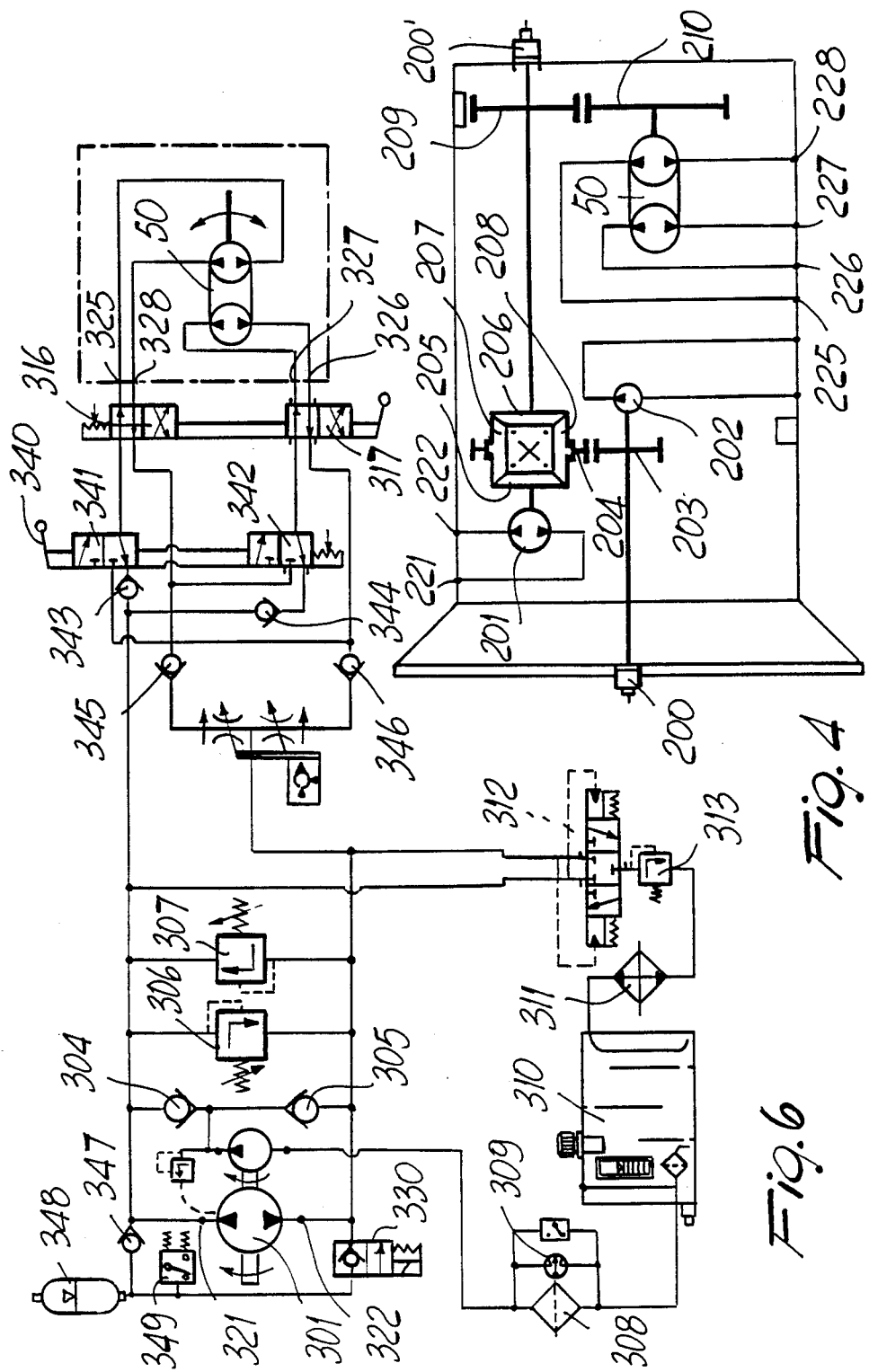
FIG. 4 is a view of a different embodiment of the unit applied in a hydraulic differential.
FIG. 6 is a view of a hydraulic circuit with power accumulation system.

According to the embodiment illustrated in FIG. 4, a differential hydraulic drive for a motor vehicle is described, wherein the hydraulic unit according to the invention is again used as a hydrostatic motor.

As in the preceding example, an engine or the like is provided which drives the input shaft 200 which, by means of the gear 203, actuates the loading pump 202. The gear 203 actuates the gear 204 which is mounted externally of the mechanical differential constituted by the satellite gears 205, 206, 207 and 208. While the input shaft 200 rotates and the output shaft 200' is stationary, the gear 206 does not rotate and accordingly the motion is transmitted through the gears 204 and 207 and 208 to drive the gear 205 which in turn drives the main pump 201.

The output flow of the pump is directed through the ports 221 and 222 to the hydraulic unit, indicated by the reference numeral 50, which is hydraulically connected to the ports 221 and 222 by means of conduits, through the ports 225, 226, 227 and 228.

When the unit 50 starts to rotate, the speed of the gear 210 increases and consequently the gear 209 and the output shaft 200' rotate. When the speed of the output shaft increases, the gear 206, which is a component part of the differential, rotates faster, causing a decrease in the speed of the gear 205 which drives the main pump.

According to what is illustrated in FIG. 5, a hydrostatic closed-loop drive is provided which, by virtue of the presence of the hydraulic unit 50 according to the invention, allows to achieve a continuously variable output speed. As previously mentioned, the ports indicated at 321, 322, 323, 324, 325, 326, 327 and 328 are connected correspondingly as in the previously described examples.

The pump 301 pumps fluid, through the ports 321 and 322, towards and away from the hydraulic unit 50. The port 321 directs the fluid to the proportional flow divider 315, which is controlled by the element 314, which element can be a manual, electric, pneumatic, hydraulic or another feedback-connected closed-loop servomechanism. The fluid flow is proportionally divided, causing variation of the output speed of the hydraulic unit. The output flow returns to the port of the pump 322 and continues to circulate as previously described.

The loading pump 302 and its retention valve 303 and control valves 304 and 305, together with high-pressure control valves 306 and 307, are commonly used in closed-loop hydrostatic systems. A filtering unit 308 and 309, an oil tank 310, a cooling unit 311 and a flow circulation system 312 and 313 are commonly used in hydrostatic systems.

The valves 316 and 317 may also be used to achieve different flow directions, so as to increase the speed of the unit 50. These valves may be controlled by the same actuators mentioned heretofore.

FIG. 6 shows the same elements provided in the above described examples, with the addition of a further circuit which defines an assembly for the accumulation of power during deceleration so as to be able to subsequently use this power when it is required in addition to the power deriving from the main motor.

During acceleration and braking, oil flows at high pressure through the control valve 347 and is accumulated in the accumulator 348, controlled by a pressure switch or by a transducer, and when the maximum accumulation power is reached the system continues to operate like an ordinary closed-loop hydrostatic system. When it is necessary to use this power the valve 330 is opened to release the accumulated power to feed the line connected to the port of the pump 322. Two additional valves 341 and 342 are furthermore provided and are actuated by a knob 340 or by electric, pneumatic, hydraulic means or by other means in cooperation with the control valves 343, 344, 345 and 346 to direct the flow to the two sections of the hydraulic unit, so that the flow is in series and not in parallel, so as to further increase the speed of the hydraulic unit according to the invention.

To what has been described above it should be furthermore added that said fixed body and said rotatable body may comprise eccentric-blade rotors, as well as linear pistons or axially inclined or radial pistons. The flow divider may furthermore be of a radial type or possibly with pressure balance means consisting of compensation loops which determine the inner and outer pressure.

From what has been described above it is thus evident that the invention achieves the proposed aims, and in particular the fact is stressed that a hydraulic unit of a new type is provided which offers the possibility of obtaining a continuous speed variation in both directions of rotation, always starting from a constant total working-fluid flow-rate.

The invention thus conceived is susceptible to numerous modifications and variations, all of which are within the scope of the inventive concept.

Furthermore all the details may be replaced with other technically equivalent elements.

In practice, the materials employed, as well as the contingent shapes and dimensions, may be any according to the requirements.

I claim:

1. Variable speed hydraulic power transmission unit, comprising;
   a fixed body having first inlet and outlet ducts for a working fluid, a first output shaft journalled to said fixed body, first fixed displacement actuating means located internally of said fixed body for interacting with said first output shaft, said first actuating means being disposed in the path of said working fluid to convert the motive energy thereof into rotational energy of said first output shaft;
   a rotatable body having second inlet and outlet ducts for a working fluid, an input shaft journalled to said rotatable body and rigidly coupled to said first output shaft of said fixed body, second fixed displacement actuating means located internally of said rotatable body for interacting with said inlet shaft, said second actuating means being disposed in the path of said working fluid to at least partially convert the motive energy thereof into mechanical energy of said rotatable body;
   a terminal output shaft affixed to said rotatable body substantially coaxially thereto;
   a flow divider having one inlet port for receiving working fluid at constant flow-rate and a pair of delivery ports, each delivery port connected with one of said first and said second inlet ducts, said flow divider being operable to continuously vary the ratio between the delivery flow rates in said first and said second inlet ducts, said rotatable body and said terminal output shaft being stationary in response to said flow divider setting the ratio between the delivery flow rates at substantially one to one and rotating in either direction at variable speeds in response to said flow divider setting the ratio between the delivery flow rates at other than one to one.

2. A hydraulic power unit, according to claim 1, further including a rotary joint interposed between said rotatable body and said fixed body for hydraulic connection therebetween, said first and said second output ducts being coupled in parallel relationship and having a common discharge duct.

3. A hydraulic power unit, according to claim 1, wherein said first and said second fixed displacement actuating means comprise substantially planetary gear means having substantially equal displacement.

4. A hydraulic power unit, according to claim 3, wherein said first actuating means comprise a set of planetary gears meshing with a sun gear affixed to one end of said first output shaft, said planetary gears being freely rotatable around axes unitary with said fixed body and extending parallel to said first output shaft.

5. A hydraulic power unit, according to claim 3, wherein said second fixed displacement actuating means comprise a set of toothed planetary wheels meshing with a toothed sun wheel affixed to one end of said input shaft, said set of planetary toothed wheels being rotatable around axes unitary with said terminal output shaft and extending substantially parallel thereto.

6. A hydraulic power unit, according to claim 1, wherein said first and said second actuating means are substantially eccentric blade rotors.

7. A hydraulic power unit, according to claim 1, wherein said first and said second actuating means are substantially linear pistons.

8. A hydraulic power unit, according to claim 1, wherein said first and said second actuating means are substantially inclined pistons.

9. A hydraulic power unit, according to claim 1, wherein said first and said second actuating means are substantially radial pistons.

10. A hydraulic power unit, according to claim 1, wherein said flow divider comprises a radial distributor.

11. A hyudraulic power unit, according to claim 1, wherein said flow divider comprises pressure balancing means including compensation loops for measuring differential pressures.

* * * * *